United States Patent [19]

Barnes

[11] 4,343,578
[45] Aug. 10, 1982

[54] LOAD BRACE STABILIZING ASSEMBLY

[76] Inventor: Burris P. Barnes, c/o Lee Richards, Rte. 5, Box 136, Tyler, Tex. 75706

[21] Appl. No.: 157,038

[22] Filed: Jun. 6, 1980

[51] Int. Cl.³ .......................... B60P 7/08; B60P 7/16; B61D 45/00
[52] U.S. Cl. .................................... 410/151; 410/143
[58] Field of Search ............ 254/29 A, 106; 410/143, 410/145, 149, 151, 153

[56] References Cited

U.S. PATENT DOCUMENTS

| | | | |
|---|---|---|---|
| 969,002 | 8/1910 | Teachout | 410/151 |
| 2,186,238 | 1/1940 | Deuel | 410/153 |
| 2,262,429 | 11/1941 | Lucker | 254/106 |
| 2,873,695 | 2/1959 | Toben | 410/145 |
| 2,901,987 | 9/1959 | Campbell et al. | 410/145 |
| 2,912,939 | 11/1969 | Miner, Jr. et al. | 410/145 |
| 3,075,478 | 1/1963 | Elsner | 410/149 |
| 3,092,043 | 6/1963 | Tobin | 410/145 |
| 3,151,571 | 10/1964 | Heard | 410/149 |
| 3,721,200 | 3/1973 | Schmidt | 410/149 |
| 3,883,106 | 5/1975 | Simonsen | 254/106 X |
| 4,023,819 | 5/1977 | Holman, Jr. | 410/151 |
| 4,236,854 | 12/1980 | Rogers | 410/143 X |

Primary Examiner—Joseph F. Peters, Jr.
Assistant Examiner—Howard Beltran
Attorney, Agent, or Firm—Dennis T. Griggs

[57] ABSTRACT

A load stabilizer assembly for use in a pickup truck includes a pair of mutually telescoping beam members which span the bed of the truck and restrain cargo therein by engaging opposite sidewalls of the bed. A lock plate is loosely coupled in sliding relation around one of the beam members, and has a slip opening through which the beam projects. The slip opening is large enough to permit the lock plate to be moved from an upstanding vertical orientation in which the lock plate is freely movable along the length of the beam, to an inclined position wherein the lock plate is seized in binding engagement with the beam member. A lock bolt carried on the other beam member transmits a driving force against the lock plate whereby compression forces are induced within the beam members as they are driven into engagement with the opposite sidewalls of the cargo compartment.

1 Claim, 3 Drawing Figures

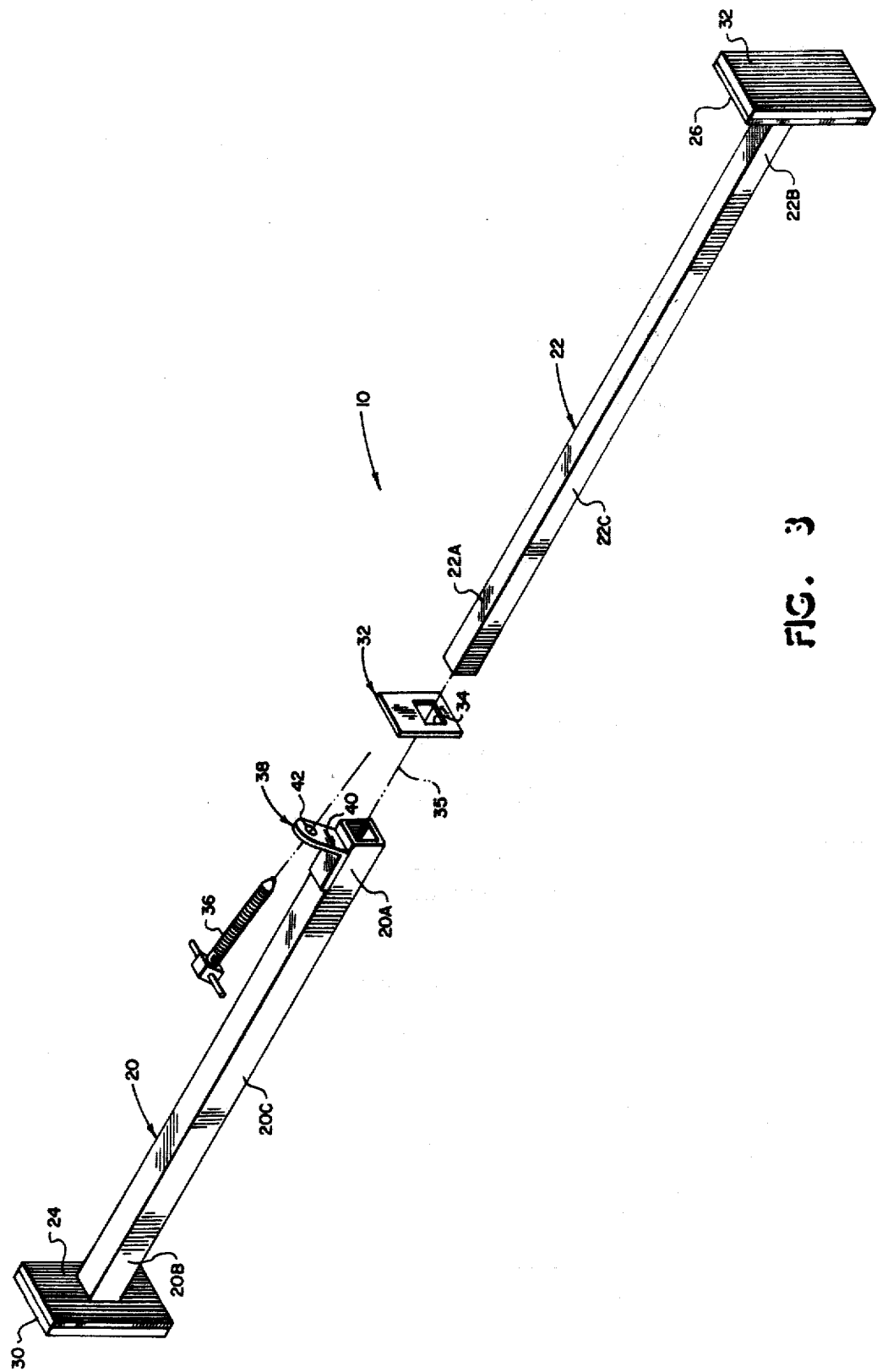

LOAD BRACE STABILIZING ASSEMBLY

BACKGROUND OF THE INVENTION

1. Field of the Invention

This invention relates to cargo loading apparatus which may be installed in transport vehicles such as trucks and the like.

2. Description of the Prior Art

A major problem involved in transporting cargo on the bed of a pickup truck or van is the provision of suitable dunnage and bracing equipment to restrain the cargo from movement during transit. Conventionally, this is most commonly accomplished by the use of ropes or belts which lash the cargo against the sidwalls of the truck bed. The lashing arrangement requires that the cargo be placed directly against a sidewall surface. Thus there is a substantial amount of space within the interior floor area of a van or truck bed for which a sidewall surface is not available for lashing purposes.

Some equipment or cargo is best transported in a vertical, hanging position. Conventional cross bars have been provided for supporting a hanging load, but require the installation of hooks or slots in fixed locations for supporting the cross bar.

It is sometimes desirable to support cargo at an elevated position above the deck floor, in order to physically separate two different loads. For example, it may be desirable to carry sheets of plywood on the deck of a pickup truck, and to carry two-by-four studs or other building equipment at an elevated position above the floor, so that either the plywood or studs are easily accessible for off-loading without lifting or moving one item to gain access to the other.

SUMMARY OF OBJECTS OF THE INVENTION

It is, therefore, the principal object of the present invention to provide an adjustable load stabilizer for restraining cargo without the use of hooks, channels, slots, ropes or belts.

Another object of the invention is to provide an adjustable cross bar for stabilizing cargo in the center of a loading deck, without placement of the cargo against the sidewall.

Yet another object of the invention is to provide a cross bar having an adjustable span which can be secured to opposite sidewalls of a cargo enclosure to produce an elevated cargo storage rack for separating two types of cargo.

Yet another object of the invention is to provide a load stabilizer assembly which can be used to stabilize a substantially vertical load at different elevations in both front and rear of the load.

Still another object of the invention is to provide a load stabilizer which can be used to support a hanging load without the use of hooks, channels, slots or the like.

SUMMARY OF THE INVENTION

According to novel aspects of the invention, the foregoing objects are achieved by a load stabilizer assembly which includes a pair of mutually telescoping beam members which span a cargo compartment and restrain cargo therein by engaging opposite sidewalls of the chamber. A lock plate is loosely coupled in sliding relation around one of the beam members, and has a slip opening through which the beam projects. The slip opening is large enough to enable the lock plate to be moved from an upstanding vertical orientation in which the lock plate is freely movable along the length of the beam, to an inclined position wherein the lock plate is seized in binding engagement with the beam member. A lock bolt carried on the other beam member transmits a driving force against the lock plate whereby compression forces are induced within the beam members as they are driven into engagement with the opposite sidewalls of the cargo compartment.

The lock plate is provided with a slip opening which is large enough to permit the lock plate to be freely movable along the length of the beam, but which also permits the lock plate to incline with respect to the axis of the beam wherein the lock plate and the beam become engaged in mutually binding relation to each other. As the lock bolt is torqued against the lock plate, a driving force extends the beam members with respect to each other and drives them into engagement with the opposite sidewalls of the cargo enclosure. Reaction forces produced in response to the driving force impose compression loading in the beam members, thereby holding the beam members securely in place against the opposite sidewalls.

Load plates are preferably attached to opposite ends of the mutually coupled beam members, and a resilient pad is attached to the load transmitting surface of each load plate. This arrangement allows the load stabilizers to be securely braced against the opposite sidewall surfaces without scratchinfg or marring the surface finish, and also produces strong frictional engagement for supporting vertical loads.

The novel features which characterize the invention are defined by the appended claims. The foregoing and other objects, advantages and features of the invention will hereinafter appear, and for purposes of illustration of the invention, but not of limitation, and exemplary embodiment of the invention is shown in the appended drawings.

DETAILED DESCRIPTION OF A PREFERRED EMBODIMENT

Figure 1:
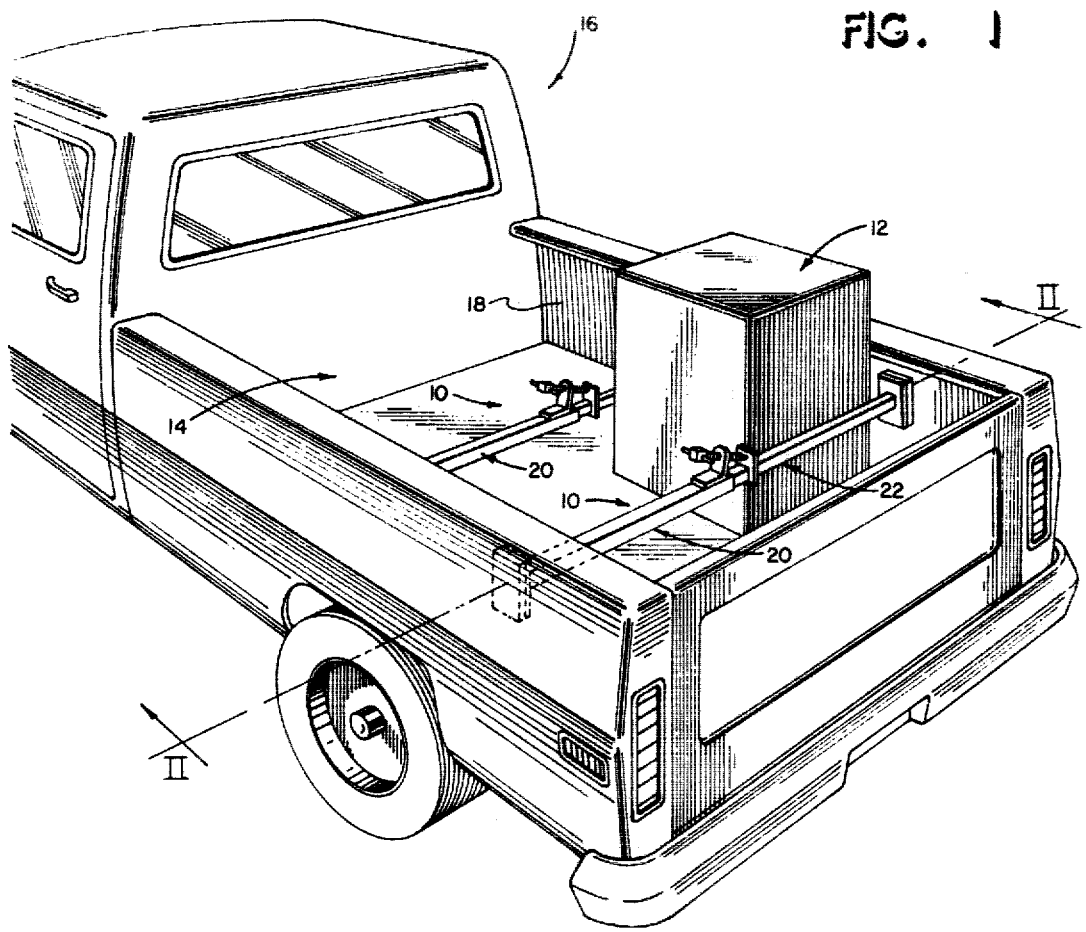
FIG. 1 is a perspective view of a pickup truck which illustrates a typical application of the load stabilizer of the invention.

In the description which follows, like parts are identified throughout the specification and drawings with the same reference numerals, respectively. The drawings are not necessarily to scale and in some instances, portions have been exaggerated in order to more clearly depict certain features of the invention.

Referring now to the drawing figures, a load stabilizer assembly 10 is shown in restraining engagement with a box 12 on the rear deck 14 of a pickup truck 16. Two load stabilizer assemblies 10 are being used, one being mounted forward, and the other aft of the box 12. The purpose of this arrangement is to prevent sliding, shifting movement of the box during transit. The box 12 is preferably confined against the sidewall 18 of the truck cargo compartment, but may be braced and stabilized in the center of the cargo area away from the sidewall 18, if desired. The box 12 is restrained against sliding, shifting movement by the load stabilizers 10 without the use of ropes or belts, and without the use of hooks, slots or channels, as will be explained below.

Figure 2:
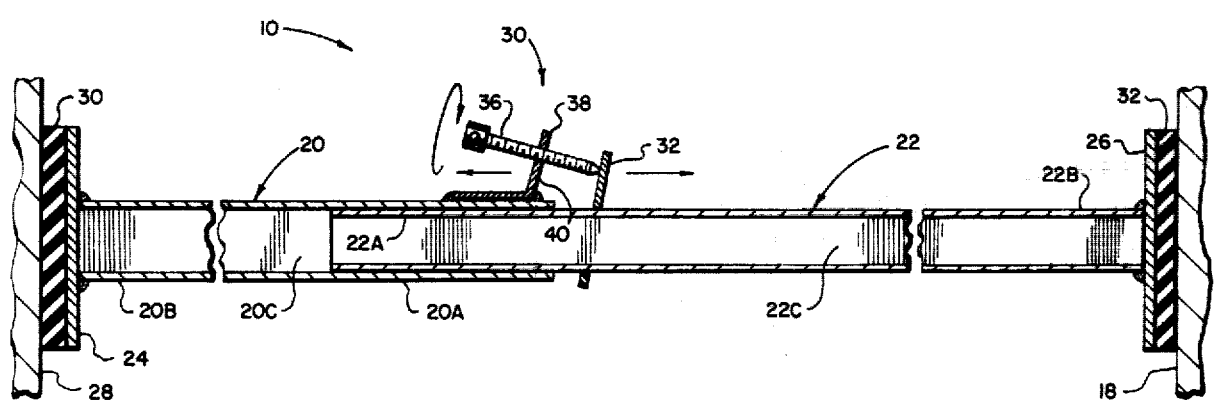
FIG. 2 is a sectional view of a load stabilizer assembly taken along the lines II—II of FIG. 1; and, FIG. 3 is an exploded perspective view of a load stabilizer assembly constructed according to the teachings of the invention.

Referring now to FIG. 2, the load stabilizer assembly 10 includes first and second tubular beams 20, 22 having overlapping end sections 20A, 22A which are coupled together in telescoping relation. Each beam 20, 22 comprises an elongated, rectangular tube formed by substantially flat sides 20C and 22C, respectively, for engaging and stabilizing cargo. The tubular beams 20, 22 are preferably constructed from a high strength metal, such as sheet steel. Particular processing details will be readily apparent to the skilled metal worker from the given construction design. In order to prevent sagging, it is important that the inner beam 22 fit closely within the beam 20, but without binding for easy extension and retraction.

Load plates 24, 26 are welded to the opposite beam ends 20B, 22B, respectively, for engaging the opposite truck bed sidewalls 18, 28, respectively. Resilient pads 30, 32 are bonded to the load transmitting surface of the load plates 24 and 26, respectively. This arrangement prevents the load plates from scratching the surface finish of the truck sidewalls, and also establishes strong frictional engagement with the sidewall for supporting a hanging load.

According to the foregoing arrangement, the load stabilizer assembly 10 serves as an adjustable cross bar for spanning the cargo space and engaging the opposite sidewalls of the truck bed. The beams 20, 22 are securely locked into engagement with the sidewalls by a locking assembly 30 which includes a lock plate or slip collar 32 which is loosely coupled in sliding relation around the inner beam 22. Referring to FIG. 3, the lock plate is provided with a rectangular slip opening 34 which is large enough to permit the lock plate to be moved from an upstanding vertical orientation in which the lock plate is freely movable along the length of the beam, to an inclined orientation (FIG. 2) relative to the longitudinal axis 35 of the beam wherein the lock plate and the beam member are engagable in mutually binding relation to each other. According to this arrangement, the lock plate 32 is loosely coupled on the beam 22 for limited pivotal movement with respect to the longitudinal axis through a limited arc of travel. When driven to the inclined position shown in FIG. 2, the slip collar 32 is seized in binding engagement with the beam and thereby transmits a driving force which extends the inner and outer beam members with respect to each other and which drives the load pads into compressive engagement with the sidewalls. In response to this driving force, compression loading is induced within the beam members as they are driven into compressive engagement with the opposite sidewalls of the truck bed.

The driving force is produced by a lock bolt 36 which is received in threaded engagement with a guide plate 38. The guide plate 38 has a flange 40 which is inclined with respect to the axis 35 of the beam 20. The flange 40 is provided with a threaded opening 42 for receiving the lock bolt 36.

In operation, the box 12 or other cargo is positioned in a desired location on the truck bed and a pair of the load stabilizer assemblies 10 are mounted forward and aft of the box 12. The beams 20, 22 are manually extended by hand pressure to the limits of travel between the opposite sidewalls, and the lock plate 32 is moved to a position adjacent the ends 20A of the outer beam 20.

The lock bolt 36 is thereafter tightened against the lock plate 32, thereby causing it to tilt or pivot in a clockwise direction until it becomes seized in binding engagement with the beam 22. As the lock bolt is torqued, the inner and outer beams are extended with respect to each other, thereby driving the load pads 30, 32 into compressive engagement with the opposite sidewalls 18, 28. The lock bolt 36 transmits a driving force against the lock plate 32 whereby compression forces are induced within the beam members as they are driven into engagement with the opposite sidewalls. The compression loading and reaction forces, together with the frictional engagement of the load pads, securely anchor the load stabilizer assembly against the sidewalls.

It will therefore be apparent that the load stabilizer assembly 10 can be quickly assembled and disassembled for restraining cargo without the use of ropes or belts, and provides an adjustable bar for stabilizing cargo in the center of a loading deck, as well as against a sidewall. It will be appreciated that two or more of the load stabilizer assemblies 10 may be installed between opposite sidewalls at different elevations in order to stabilize a large vertical load, such as a refrigerator, at different elevations in both front and rear of the load. Additionally, because of the strong frictional engagement of the load pads against the sidewalls, the load stabilizer 10 can support a hanging load without the use of hooks, channels, slots or the like. Because the span of the load stabilizer assembly is continuously adjustable, it can be used in combination with various personal vehicles such as trucks and vans, as well as commerical vehicles such as panel trucks and railroad freight cars.

From the foregoing description of a preferred embodiment of the invention, those skilled in the art will appreciate that the load stabilizer assembly of the present invention represents a substantial improvement over conventional bracing and dunnage equipment. Although a preferred embodiment of the invention has been described in detail, it should be understood that various changes and alterations can be made therein without departing from the spirit and scope of the invention as defined by the appended claims.

What is claimed is:

1. In combination, a pickup truck having a load bed and upstanding sidewalls on opposite sides of the load bed, a load resting on the load bed, and first and second stabilizer assemblies spanning the load bed and engaging said upstanding sidewalls, with the load being lodged between said stabilizer assemblies and restrained thereby against shifting movement, each stabilizer assembly including first and second tubular beam members coupled in mutually telescoping engagement wherein said second tubular beam member is slidable within said first tubular beam member; each tubular beam member having a plurality of elongated, substantially flat sides extending substantially the entire length of the assembly with one flat side engaging said load; load plates attached to opposite ends of the mutually coupled beam members, and a resilient pad attached to the load transmitting surface of each load plate engaging said upstanding sidewalls; a slip collar encircling said second tubular beam member and movable along said second tubular beam member to a position adjacent the end of said first tubular beam member, said slip collar being mounted on said second tubular beam member for limited pivotal movement with respect to the longitudinal axis of said second tubular beam member, whereby said slip collar is movable from a substantially upright position in which it is freely displaceable along said second tubular beam member to an inclined position wherein said slip collar is seized in binding engagement with said second tubular beam member; and, means mounted on the first tubular beam member for transmitting a driving force against said slip collar whereby compression loading is induced within said beam members as said beam members are driven into engagement with the opposite sidewalls of the load bed in response to the driving force, said driving means including a guide plate mounted on said first tubular beam member, and a lock bolt received in threaded engagement with said guide plate and being disposed for positive engagement with said lock plate to effect said driving force.

* * * * *